F. J. VIERLING AND F. R. BARTHOLOMEW.
COMBINED WHISTLE AND TOP.
APPLICATION FILED MAR. 13, 1920.
1,373,371.
Patented Mar. 29, 1921.
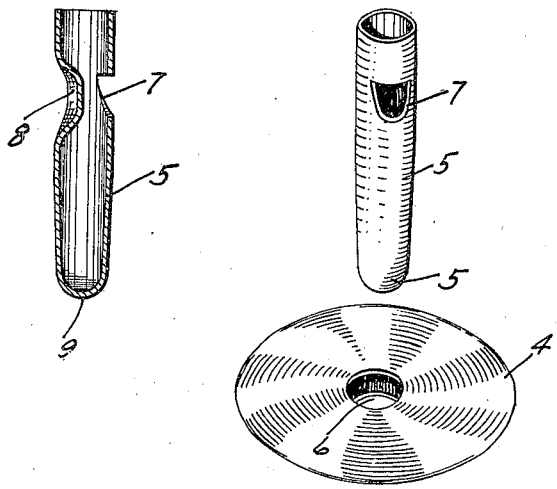
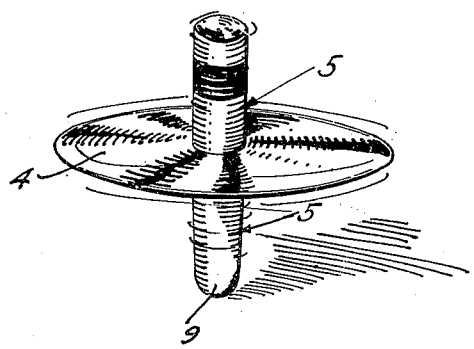
INVENTORS
Frank J. Vierling
Fred R. Bartholomew
BY THEIR ATTORNEYS
Williamson Merchant

UNITED STATES PATENT OFFICE.

FRANK J. VIERLING AND FRED R. BARTHOLOMEW, OF MINNEAPOLIS, MINNESOTA.

COMBINED WHISTLE AND TOP.

1,373,371.      Specification of Letters Patent.     Patented Mar. 29, 1921.

Application filed March 13, 1920. Serial No. 365,431.

*To all whom it may concern:*

Be it known that we, FRANK J. VIERLING and FRED R. BARTHOLOMEW, citizens of the United States, residing at Minneapolis, in the county of Hennepin and State of Minnesota, have invented certain new and useful Improvements in Combined Whistles and Tops; and we do hereby declare the following to be a full, clear, and exact description of the invention, such as will enable others skilled in the art to which it appertains to make and use the same.

Our invention has for its object to provide a combined whistle and top, and to this end, it consists of the novel devices and combinations of devices hereinafter described and defined in the claim.

In the accompanying drawings, which illustrate the invention, like characters indicate like parts throughout the several views.

Referring to the drawings:—

Figure 1 is a perspective view of the invention;

Fig. 2 is a view corresponding to Fig. 1, with the exception that the numbers have been separated; and Fig. 3 is a view of the combined tubular whistle and top peg in longitudinal central section.

The invention consists of a disk-like whistle 4 and a cylindrical whistle 5, adapted to be separately secured in assembled relation to afford a top, in which the former of said whistles affords the body of the top, and the latter of said whistles affords a peg thereof. The disk-like whistle 4 is made from two concavo-convex plates arranged with their convex faces turned outward and having formed therein axially alined holes 6. To rigidly connect the two members of the disk-like whistle 4, one of said members has its peripheral edge portion extended outward of the periphery of the other of said members and folded or clenched thereon.

The combined whistle and top peg 5 is formed from a tubular body in which is cut a notch 7, and back of said notch and below the upper end of said peg, said body is indented at 8 to form the throat of the whistle. The lower end of the tubular body is closed and rounded at 9 to afford the spinning end of the top. To assemble the two tops 4 and 5 and thereby convert the same into a top, as shown in Fig. 1, the whistle 5 is inserted through the alined holes 6 in the whistle 4 and frictionally connects said whistles. The body of the whistle 5, below the notch 7, is preferably made slightly tapered so that the same may be forced into the holes 6 with a wedging action to more securely connect said members.

The purpose of forming the indentation 8 below the top of the whistle 5, is to leave a smooth round surface, which may be held between the fingers when spinning the top.

The above described invention, while extremely simple and of small cost, gives a child three toys in one, two whistles and a top.

What we claim is:

A toy comprising an annular body having an axial opening, and a tubular peg having a closed rounded lower end, said body comprising two concavo-convex disks having their peripheral edge portions connected and their convex faces turned outward to afford a whistle, said tubular peg being provided with a notch and an indentation back of said notch and below the upper end of the peg, said peg adapted to be inserted into said axial opening and frictionally secured to the body.

In testimony whereof we affix our signatures.

FRANK J. VIERLING.
FRED R. BARTHOLOMEW.